(12) United States Patent
Unterlass et al.

(10) Patent No.: US 10,563,013 B2
(45) Date of Patent: Feb. 18, 2020

(54) PROCESS FOR PRODUCING POLYIMIDES

(71) Applicant: Technische Universität Wien, Vienna (AT)

(72) Inventors: Miriam Margarethe Unterlass, Vienna (AT); Bettina Baumgartner, Vienna (AT)

(73) Assignee: Technische Universität Wien, Vienna (AT)

( * ) Notice: Subject to any disclaimer, the term of this patent is extended or adjusted under 35 U.S.C. 154(b) by 48 days.

(21) Appl. No.: 15/573,273

(22) PCT Filed: May 13, 2016

(86) PCT No.: PCT/AT2016/050140
§ 371 (c)(1),
(2) Date: Nov. 10, 2017

(87) PCT Pub. No.: WO2016/179625
PCT Pub. Date: Nov. 17, 2016

(65) Prior Publication Data
US 2018/0112039 A1 Apr. 26, 2018

(30) Foreign Application Priority Data

May 13, 2015 (AT) .................................. A 304/2015
Jan. 20, 2016 (AT) .................................... A 20/2016

(51) Int. Cl.
*C08G 73/10* (2006.01)

(52) U.S. Cl.
CPC ................................ *C08G 73/1032* (2013.01)

(58) Field of Classification Search
CPC . C08G 73/1032; C08G 73/1028; C08G 73/10
USPC ....................................................... 528/351
See application file for complete search history.

(56) References Cited

U.S. PATENT DOCUMENTS

| | | | | |
|---|---|---|---|---|
| 5,380,805 A * | 1/1995 | Tamai | ................ | C08G 73/1042 525/420 |
| 2019/0177483 A1* | 6/2019 | Unterlass | ........... | C08G 73/1032 |

FOREIGN PATENT DOCUMENTS

| | | |
|---|---|---|
| DE | 68918397 T2 | 3/1995 |
| DE | 69106956 T2 | 8/1995 |
| EP | 0367482 A1 | 5/1990 |
| EP | 0391633 A2 | 10/1990 |
| EP | 0465858 A1 | 1/1992 |
| EP | 0604813 A1 | 7/1994 |

OTHER PUBLICATIONS

Int'l Search Report dated Aug. 31, 2016 in Int'l Application No. PCT/AT2016/050140.
Written Opinion dated Aug. 31, 2016 in Int'l Application No. PCT/AT2016/050140.
Brunel et al., "Water-Borne Polyimides Via Microwave-Assisted Polymerization," High Performance Polymers, vol. 22, pp. 82-94 (2010).
Dao et al., "Microwave-Assisted Aqueous Polyimidization Using High-Throughput Techniques," Macromol. Rapid Commun., vol. 28, No. 5, pp. 604-607 (2007).
Int'l Preliminary Report on Patentability dated Aug. 31, 2016 in Int'l Application No. PCT/AT2016/050140.

* cited by examiner

*Primary Examiner* — Douglas J McGinty
(74) *Attorney, Agent, or Firm* — Panitch Schwarze Belisario & Nadel LLP

(57) ABSTRACT

A solvothermal synthesis process for polyimides is provided. The process uses solution polymerization of monomers in an appropriate solvent, by mixing the solvent and the monomers and heating the mixture under pressure at temperatures exceeding the respective boiling point at normal pressure. The process produces essentially completely crystalline polyimides by a) mixing and heating the solvent and the monomers by either (i) heating the solvent up to solvothermal conditions and subsequently adding the monomers to initiate the reaction, or (ii) mixing the monomers with the solvent and heating the mixture up to solvothermal conditions within a period of 5 min, the reaction temperature TR being held below the solid-state polymerization temperature TP of the monomers during the polymerization; and b) carrying out the solution polymerization until essentially complete conversion is achieved.

12 Claims, 12 Drawing Sheets

PROCESS FOR PRODUCING POLYIMIDES

CROSS-REFERENCE TO RELATED APPLICATION

This application is a Section 371 of International Application No. PCT/AT2016/050140, filed May 13, 2016, which was published in the German language on Nov. 17, 2016, under International Publication No. WO 2016/179625 A1, and the disclosure of which is incorporated herein by reference.

The present invention relates to the preparation of crystalline polyimides by solvothermal synthesis.

STATE OF THE ART

Polyimides are valuable materials for diverse applications. They are usually synthesized by polycondensation of diamines with di-anhydrides in solution, in molten or solid state. Surprisingly, it was found some years ago that under so called "hydrothermal conditions", i.e. in case of a reaction under pressure at temperatures above 100° C., even water may be used as a solvent for the synthesis of polyimides in spite of the dehydration reaction occurring during the condensation reaction (see Hodgkin et al., "Water as a Polymerization Solvent-cyclization of Polyimides: Le Chatelier Confounded?", Polym. Prep. (American Chemical Society, Division of Polymer Chemistry) 41, 208 (2000), and WO 99/06470). When using other solvents than water, conditions using temperatures above their respective boiling points are referred to as "solvothermal conditions".

This condensation reaction has a two-stage mechanism, including the formation of amic acids which subsequently undergo dehydrative cyclization to form the corresponding imides. In 1999, Dao et al. examined factors having a significant influence on imidation reactions (Dao, Hodgkin and Morton, "Important Factors Controlling Synthesis of Imides in Water", High Perform. Polym. 11, 205-218 (1999), "Dao 1999") and found, among other things, that the higher the temperature of the imidation reaction, the higher the degree of purity of the obtained products.

The reaction equilibrium of this dehydrative cyclization is shifted to the product side even if water is used as a solvent, which is due to a change of the solvent's properties under solvothermal conditions. Under these conditions, water behaves like a pseudo-organic solvent (Hodgkin et al., supra).

Usually, before carrying out the polymerization, a stoichiometric salt is formed from the diamide and the di-anhydride, in most cases by simply mixing this monomers in water and separating the salts, precipitating in water, by filtration. In doing so, anhydrides undergo hydrolyzation to form free tetracarboxylic acids, two carboxyl groups of which acids forming an ammonium salt with one amino group each (Unterlass et al., "Mechanistic study of hydrothermal synthesis of aromatic polyimides", Polym. Chem. 2011, 2, 1744). In the thus obtained monomeric salts, which are sometimes referred to as "AH salts" (by analogy to polyamide and, in particular, nylon synthesis), the two monomers are present at a molar ratio of 1:1, so that the subsequent polymerization results in highly pure polyimides. The reaction scheme below is an example of the reaction of two typical aromatic monomers:

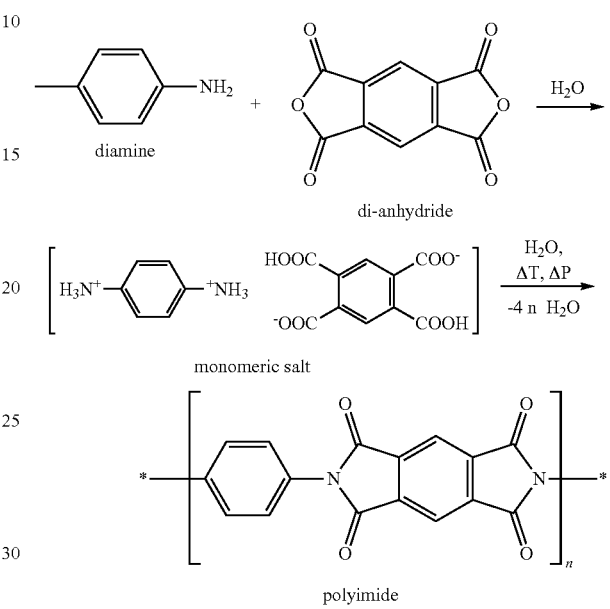

Another modern technology which has been used to synthesize organic compounds for some years and recently has also been applied to polyimides consists in the exposure to microwave radation, resulting in a significant reduction of reaction times and an increase of the reactions' selectivity (Lindstrom et al., "Microwave Assisted Organic Synthesis: a Review", Tetrahedron 57, 9225-9283 (2001); Perreux et al., "A Tentative Rationalization of Microwave Effects in Organic Synthesis According to the Reaction Medium, and Mechanistic Considerations", Tetrahedron 57, 9199-9223 (2001)). Also, microwaves have already been used in the synthesis of polyimides (Lewis et al., "Accelerated Imidization Reactions using Microwave Radiation", J. Polym. Sci., Part A: Polym. Chem. 30, 1647-1653 (1992) and U.S. Pat. No. 5,453,161).

So far, however, there are only two reports on the microwave-assisted hydrothermal synthesis of polyimides: on the one hand, Dao et al. (Dao, Groth and Hodgkin, "Microwave-assisted Aqueous Polyimidization using High-throughput Techniques", Macromol. Rapid Commun. 28, 604-607 (2007); "Dao 2007") carried out serial experiments using a ternary monomeric mixture of one diamine (4,4'-oxydianiline, ODA) and two di-anhydrides (4,4'-(hexafluoroisopropylidene)diphthalic anhydride, 6-FDA; pyromellitic di-anhydride, PMDA) at temperatures between 120° C. and 200° C. and found out that, if the aim was to obtain as high molecular weights as possible, the best results for the thus obtained random (block) copolymers of the formula below were obtained at 180-200° C.:

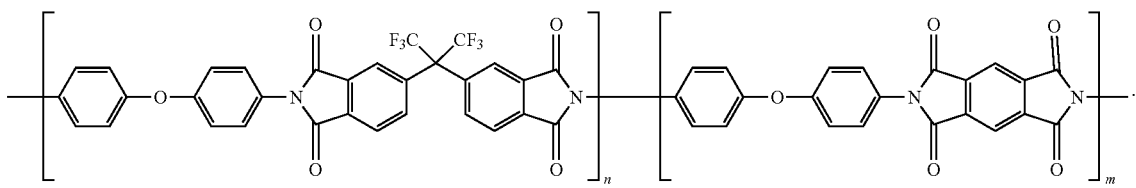

On the other hand, only a few years ago, Brunel et al. (Brunel, Marestin, Martin and Mercier, "Water-borne Polyimides via Microwave-assisted Polymerization", High Perform. Polym. 22, 82-94 (2010)) used a binary polyimide of ODA and 4,4'-(4,4'-isopropylidene diphenoxy) bis(phthalic anhydride) (Bisphenol A di-anhydride, BPADA)

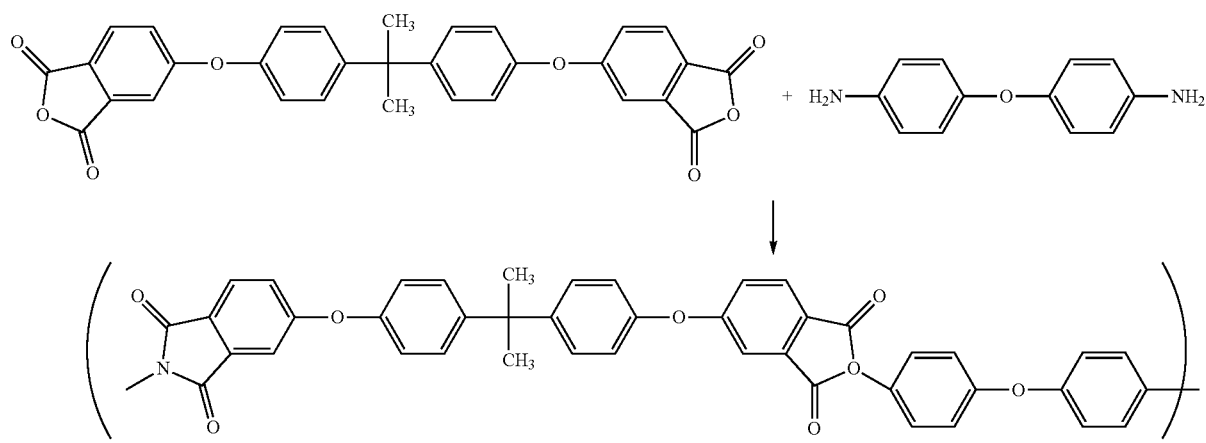

to confirm again that the application of microwaves resulted in a significant reduction of reaction times, i.e. from 4 to 12 h to only 5 to 10 min. However, the conversions achieved in this short time are relatively low, i.e. approx. 20%.

The crystallinity of the products did not have an influence in the two microwave-assisted hydrothermal syntheses: Dao 2007 (supra) does not mention any properties of the obtained polyimides with the exception of molecular weights and solubilities. It was, however, impossible to obtain a crystalline product using the studied ternary system; this was not the aim of the study in the first place, as the obtained polyimides were examined with regard to their use for producing membranes. Thus, the aim was to achieve high solubilities in organic solvents in order to be able to use such solutions for casting films. And Brunel et al. (supra) explicitly disclose (on page 89) that they obtained amorphous products. As their aim was the preparation of cast polyimide films (using m-cresol solutions), too, the crystallinities of the products were not considered important, either.

The preparation of "covalent organic frameworks" (COF) is a very recent technology using crystalline polyimides which may sometimes have large pores (Fang et al., "Designed synthesis of large-pore crystalline polyimide covalent organic frameworks", Nature Communications 5, 4503 (2014)). For this purpose, highly crystalline polyimides are required, and amorphous products or products having highly amorphous portions are absolutely unsuitable.

Against this background, the aim of the present invention was to develop an efficient process for producing highly crystalline polyimides having as high a degree of purity as possible.

DISCLOSURE OF THE INVENTION

The above aim is achieved by providing a solvothermal synthesis process for crystalline polyimides using solution polymerization of monomers in an appropriate solvent by mixing the solvent and the monomers and heating the mixture under pressure at temperatures exceeding the respective boiling point at normal pressure; said process being characterized in that it produces essentially completely crystalline polyimides by a) mixing and heating the solvent and the monomers by either
  a1) heating the solvent up to solvothermal conditions and subsequently adding the monomers to initiate the reaction, or
  a2) mixing the monomers with the solvent and heating the mixture up to solvothermal conditions within a period of 5 min, the reaction temperature TR being held below the solid-state polymerization temperature $T_P$ of the monomers during the polymerization; and b) carrying out the solution polymerization until essentially complete conversion is achieved.

This process is based on several new findings of the inventors:

First, the crystallinity of polyimides produced by solvothermal and, in particular, hydrothermal synthesis is higher the lower the proportion of monomers dissolved in the solvent before reaching solvothermal conditions. This means that either the monomers and the solvent together need to reach solvothermal conditions as fast as possible, i.e. they need to be heated at a temperature above the solvent's boiling point within 5 min, preferably within 3 min, more preferably within 2 min and in particular within only 1 min, or the solvent is heated separately, the monomers only being added as soon as solvothermal conditions have been established.

Second, if the monomers and the solvent are heated together, the reaction temperature $T_R$ has to be kept below the solid-state polymerization temperature $T_P$ of the monomers (which may be determined by means of thermogravimetric analysis (TGA)), as otherwise the amorphous portions in the product increase. According to the present invention, in step a2) above, the polymerization is thus carried out at a reaction temperature $T_R$ which is at least 5° C., more preferably at least 10° C., below $T_P$ in order to obtain as completely crystalline polyimides as possible.

Third, if the solvent and the monomers are heated separately and mixed afterwards, the monomers are heated that quickly by the hot solvent that it becomes impossible for the monomers to dissolve before the reaction temperature is reached and the polymerization reaction is initiated. In step a1 of the process of the invention, the reaction temperature thus has not to be limited.

Limiting the reaction temperature at which the solvent and the monomers are heated together according to step a2) of the process of the invention is diametrically opposed to the established teachings according to which imidation reactions are to be carried out at as high a temperature as possible (Dao 1999, supra; Dao 2007, supra).

By way of comparison: Brunel et al. used microwave radiation to heat their reaction mixtures fast, but chose a reaction temperature of 200° C. (according to the teachings of Dao et al.) and thus obtained products which were amorphous throughout. The present inventors used TGA (see FIG. 1) to determine that the $T_P$ of the monomeric mixture of ODA and BPADA used by Brunel et al. was 148° C., which means that Brunel et al. had carried out the polymerization reaction at a temperature of approximately 52° C. above the $T_P$; moreover, they stopped the reaction after a few minutes instead of waiting for achieving an essentially complete conversion as provided by the present invention.

The present invention is not limited to using diamines and di-anhydrides as monomers; it is also possible to use higher amines and/or anhydrides, such as tri- or tetraamines or -anhydrides. Higher monomers are preferred according to the invention to obtain crosslinked polyimides which are suitable for use in the covalent organic frameworks (COF) mentioned above (cf. Fang et al., supra). The reaction mechanism of the polycondensation of higher monomers or mixtures of bivalent or higher monomers and the principle of the invention of course essentially correspond to those of bivalent reagents, which is why the latter are used in the illustrative examples below. Nevertheless, when "diamines", "dianhydrides" and "tetracarboxylic acids" are mentioned below, higher monomers should be regarded to be implicitly disclosed, too, unless the context dictates otherwise. To obtain essentially pure, highly crystalline products, it is critical that the stoichiometry of the monomeric mixtures is as exact as possible.

According to the present invention, an additional step of forming stoichiometric salts (monomeric salts, "AH salts") having a molar ratio between diamine and dianhydride of 1:1 preferably precedes step a) in order to keep the proportion of non-converted monomers contained in the polyimides as low as possible. When using higher monomers in the process of the invention, this additional preparatory process step, of course, provides salts having different molar ratios, corresponding to the monomers' valence, i.e. a ratio of approximately 3:2 when combining diamines with trianhydrides (or dianhydrides with triamines), etc.

The solvent used in the process is only limited insofar as the solubility of the monomers and their stoichiometric salt in the solvent needs to be sufficiently low and that its boiling point should be below the $T_P$ of the two monomeric components. In view of costs and environmental strain, water or one or several alcohols or a mixture of water and alcohol(s) is/are preferably used as the solvent, water being particularly preferred, which means that particularly preferred embodiments of the invention provide a process for hydrothermally synthesizing polyimides.

According to the present invention, an aromatic diamine and/or an aromatic tetracarboxylic anhydride is/are preferably used as the monomeric component(s). Even more preferably, both components are aromatic, as this increases the rigidity of the polymer chain, which, on the one hand, favors crystallization and, on the other hand, reduces the solubility in the solvents water and alcohol which are preferred according to the invention. For the purpose of the present invention, in particular a stoichiometric salt of an aromatic diamine and an aromatic tetracarboxylic anhydride or higher aromatic amines and anhydrides are used.

As, according to the present invention, the heating time until reaching solvothermal conditions should be as short as possible, so that as small a portion of the monomer components as possible dissolves during that time, the process of the invention in particular comprises step a1) of separately heating the solvent to solvothermal conditions and subsequently adding the monomers to the hot solvent, as this altogether prevents any dissolution of the monomers before solvothermal conditions are established. Since this requires more elaborate equipment and since the results obtainable by the alternative step a2) are also very good, it may in some cases also be preferred over a1) to heat monomers and solvent together as fast as possible.

In preferred embodiments, "heating together as fast as possible" comprises the use of microwave radiation, as this method (as mentioned above) has become an established technique in organic synthesis and is thus particularly preferred according to the present invention. However, those skilled in the art will appreciate that, depending on the type of reactors, other ways of quickly heating reaction mixtures, such as optical heating processes using infrared lasers or the like, will yield at least comparable results and are thus considered basically equal to microwave radiation.

The type of process used strongly depends on the monomer types and the resulting crystallization tendency of polyimides as well as the solubility of the monomers in the solvent. If the monomers are practically insoluble in the solvent and the difference between the temperature of the heating medium and the desired solvent temperature during polymerization, the use of (very hot) heating baths or circulating air ovens may also provide very good results. This is particularly the case if, for example, aromatic or other monomers having a highly rigid molecule structure are used, as illustrated by the exemplary embodiments described below. In general, it has to be made sure, as has already been mentioned above, that the time until solvothermal conditions are reached is not longer than 5 min, preferably not longer than 3 min, even more preferably not longer than 2 min, particularly preferably not more than 1 min, if the solvent and the monomers are heated together in step a2).

BRIEF DESCRIPTION OF THE DRAWINGS

The present invention is described below referring to specific exemplary embodiments and the appending drawings which show the following.

EXAMPLES

All the reactants used for the hydrothermal synthesis of polyimides described below were obtained from commercial sources and used without any further purification. Thermogravimetric analyses were carried out using a Netzsch TG 209 Analyzer, and IR spectroscopies were carried out on a Bruker Tensor 27. X-ray powder diffractograms were recorded using a PANalytical X'Pert Pro multi-purpose diffractometer, and scanning electron microscopies were carried out using a Quanta 200F FEI.

Abbreviations
HT: hydrothermal
XRD: X-ray diffractometry
IR: infra-red spectrometry
TGA: thermogravimetric analysis
SEM: scanning electron microscopy
PDA: p-phenylenediamine, 1,4-diaminobenzene
PMA: pyromellitic acid, benzene-1,2,4,5-tetracarboxylic acid
PMDA: pyromellitic di-anhydride, benzene-1,2,4,5-tetracarboxylic di-anhydride
PPPDI: poly(p-phenylene pyromellitic diimide)
BTA: benzophenone-3,3',4,4'-tetracarboxylic acid
BTDA: benzophenone-3,3',4,4'-tetracarboxylic di-anhydride
PPBTDI: poly(p-phenylene benzophenone tetracarboxylic diimide)
Bz: benzidine, 4,4'-diaminobiphenyl
PBBTDI: poly(p-biphenylene benzophenone tetracarboxylic diimide)
TAPB 1,3,5-tris(4-aminophenyl)benzene
PBTPPDI poly(benzoltri(p-phenylene)pyromellitic diimide)
$X_{cr}$: degree of crystallinity Example 1—Preparation of poly(p-phenylenepyromellitic diimide), PPPDI

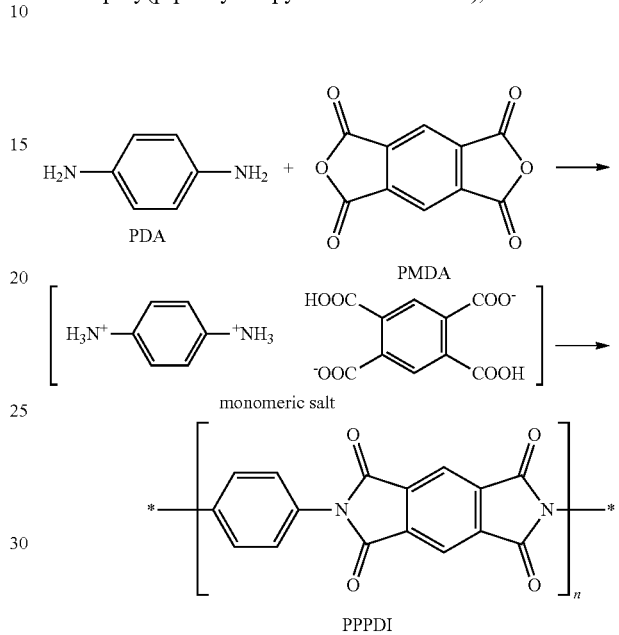

a) Preparation of the Monomeric Salt [$H_2PDA^{2+}PMA^{2-}$]

Under an inert atmosphere, 0.327 g PMDA were added to a three-necked flask, equipped with a reflux condenser, and dissolved in 15 mL of distilled water. The solution was heated to 80° C. and 0.162 g PDA were added while stirring, resulting in the immediate precipitation of the monomeric salt as a white powder. Stirring was continued for 2 h; whereafter the salt was filtered off and dried in vacuo. TGA analysis of the dried monomeric salt resulted in a solid-state polymerization temperature $T_P$ of 205° C.

b) HT Polymerization

The monomeric salt was dispersed in 15 mL of distilled water, introduced into a non-stirred autoclave and heated up to HT conditions within 4.5 min and then further heated to 200° C. After 1 h at this reaction temperature, the autoclave was quickly cooled to room temperature, and the PPPDI which had been formed was filtered off, washed with distilled water, and dried overnight in vacuo at 40° C.

Figure 1:
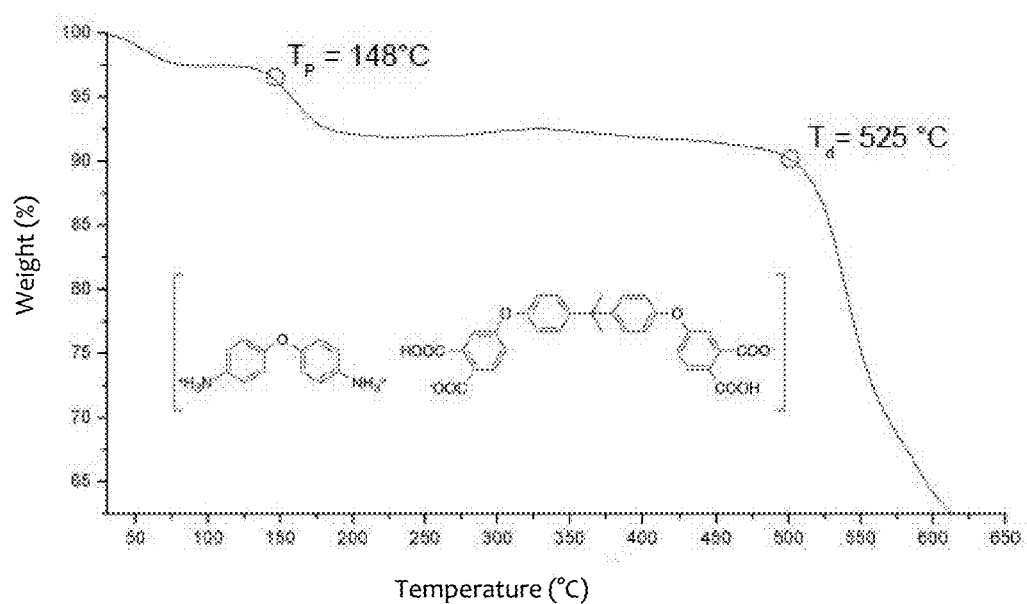
FIG. 1 shows a TGA curve of the monomeric mixture according Brunel et al. (supra).
Figure 2:
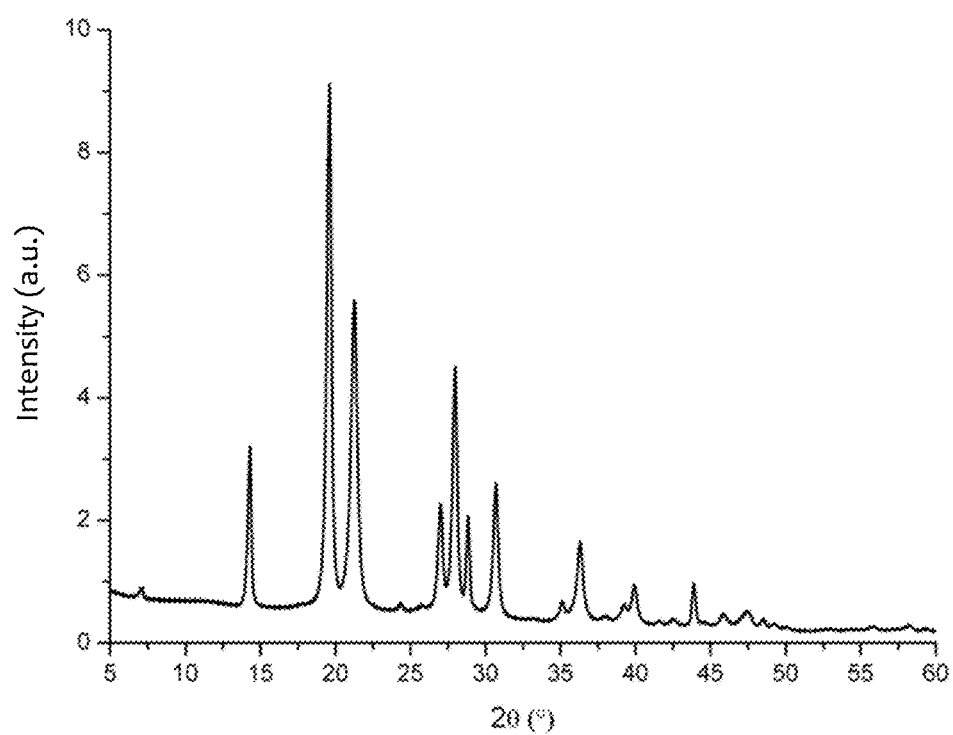
FIG. 2 shows the XRD pattern of the polyimide obtained in example 1 of the invention.
Figure 3:
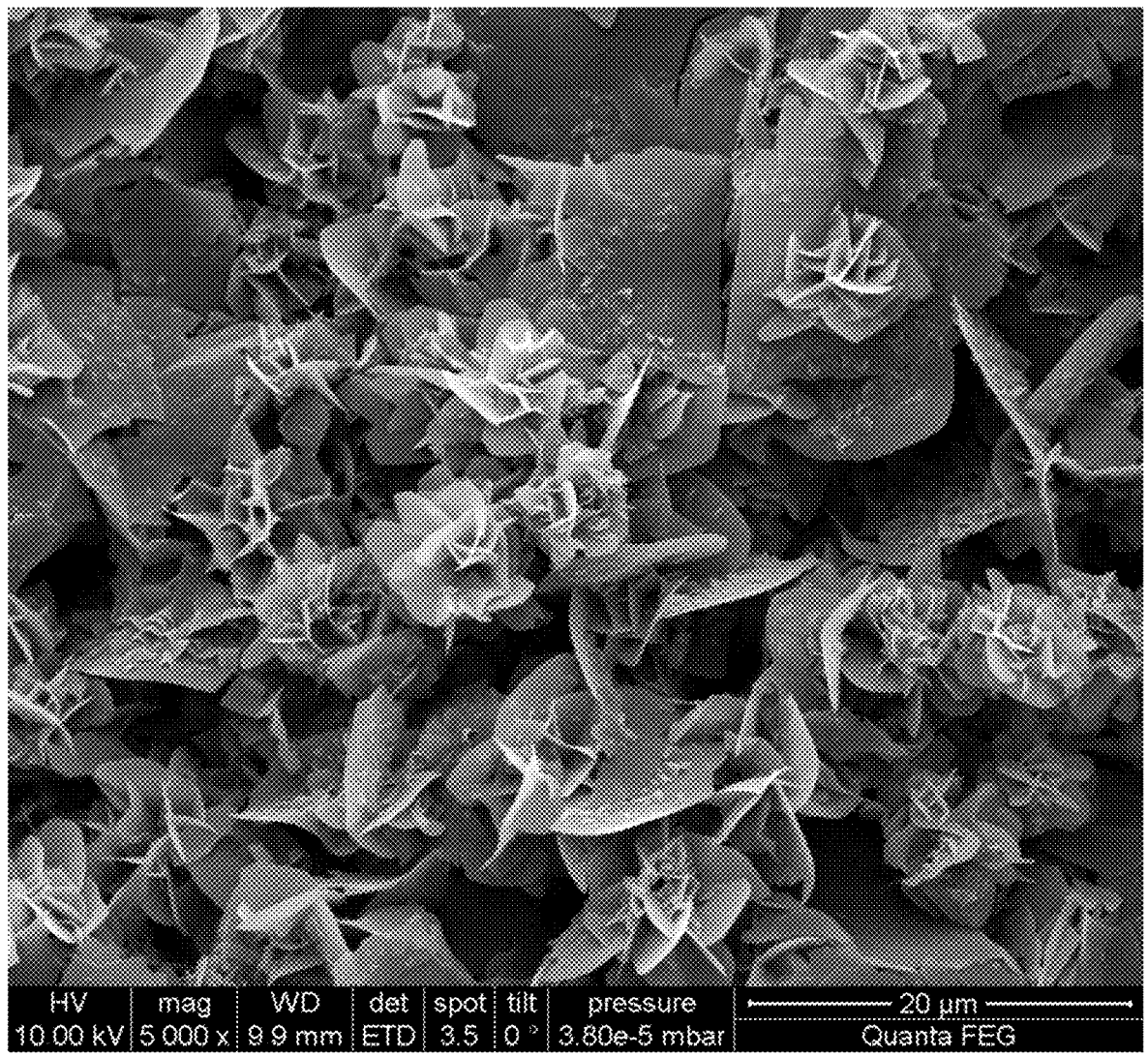
FIG. 3 shows a SEM image of the polyimide obtained in example 1 of the invention.

The PPPDI was orange and completely imidated, as determined using FT-ATR-IR (1783 cm$^{-1}$ (C=O imide); 1709 cm$^{-1}$ (C=O imide); 1365 cm$^{-1}$ (C—N)), showing no discernable oscillations of the monomers or the monomeric salt. Using powder XRD, complete crystallinity of the product which existed in the form of two solid crystalline phases, i.e. without any amorphous portions, was determined. The degree of crystallinity $X_{cr}$ thus amounted to >99%. FIG. 2 shows the XRD pattern of the obtained polyimide. SEM showed that the obtained PPPDI had a very homogeneous, regular morphology, which is further evidence of the extremely high degree of crystallinity. FIG. 3 shows SEM images of the polyimide.

Example 2—Larger-scale Preparation of PPPDI

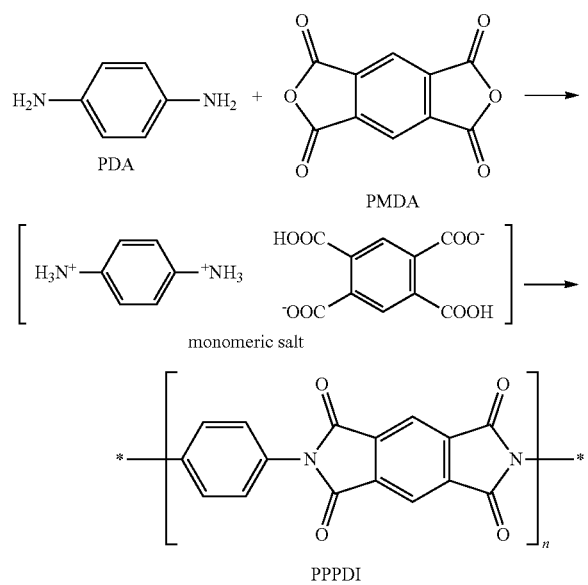

The method of Example 1 was essentially repeated, with the exception that the monomeric salt was formed from 8.72 g PMDA and 4.33 g PDA in 400 mL of distilled water. In a stirred reactor in an autoclave, this monomeric salt ($T_P$ 205° C.) was then heated to HT conditions within 4 min and subsequently also heated to 200° C., and the product was isolated and dried in the same way as in Example 1. The purity and crystallinity of this PPPDI, as determined by IR and XRD, corresponded to those of the product from Example 1: $X_{cr}$>99%.

Without wishing to be bound by theory, it is assumed that, in addition to the low water solubility of the monomers, the high rigidity of the obtained polyimide is responsible for the high degree of crystallinity of the obtained PPPDI, as mesomeric effects result in a largely planar arrangement of the repeating units of the polymer molecule.

Example 3—Preparation of Poly(p-phenylenebenzophenone tetracarboxylic diimide), PPBTDI

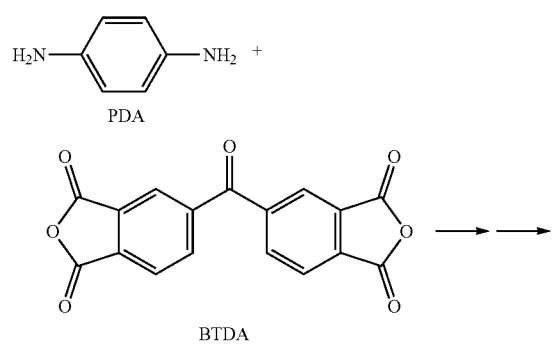

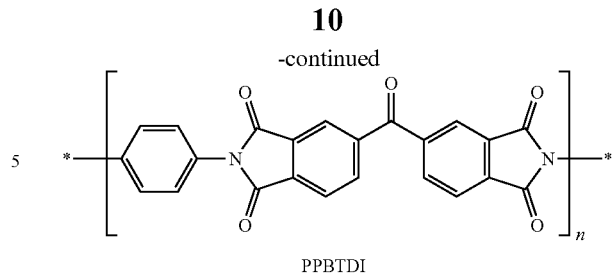

In a manner analogous to the method described in Example 1, 0.48 g (1.5 mmol) BTDA in 15 mL dist. water and 0.11 g PDA were converted into the monomeric salt [$H_2PDA^{2+}BTA^{2-}$] while stirring, which was done at room temperature, though. The $T_P$ of this monomeric salt was 149° C., as determined by TGA, which monomeric salt was subsequently introduced into an autoclave together with 15 mL of water and heated up to HT conditions within 5 min and finally to 140° C. without stirring and then polycondensed for 12 h to obtain the polyimide PPBTI.

Figure 4:
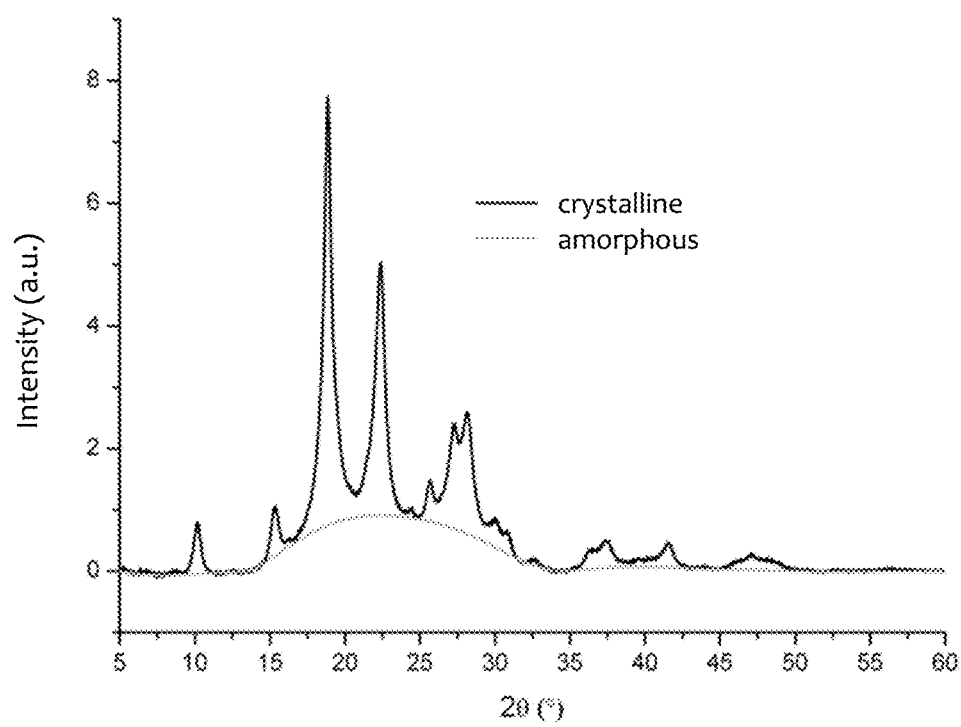
FIG. 4 shows the XRD pattern of the polyimide obtained in example 3 of the invention.
Figure 5:
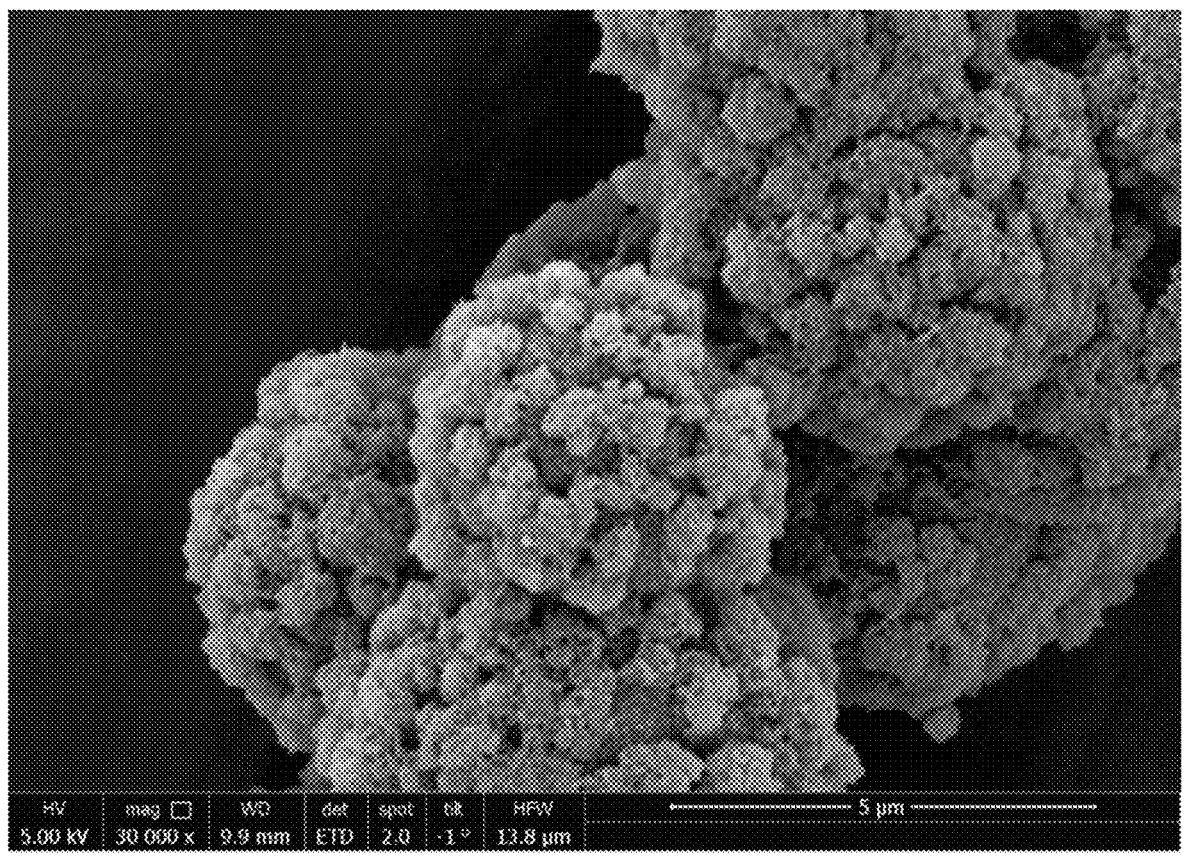
FIG. 5 shows a SEM image of the polyimide obtained in example 3 of the invention.

IR of the brownish crystals showed complete imidation (1781 cm$^{-1}$ (C=O imide); 1717 cm$^{-1}$ (C=O imide); 1378 cm$^{-1}$ (C—N)), as there were no discernable oscillations caused by monomers or the monomeric salt. Crystallinity was examined by powder XRD. FIG. 4 shows the XRD pattern of PPBTDI, a Gauss curve corresponding approximately to the proportion of amorphous structures being laid under the curve of the crystalline peaks. From the areas under the two curves a degree of crystallinity $X_{cr}$ of approx. 62% was calculated. Nevertheless, the SEM image of the polyimide presented in FIG. 5 shows that the morphology the obtained PPBTDI is highly regular.

Example 4—Preparation of poly(p-biphenylenbenzophenone tetracarboxylic diimide), PBBTDI

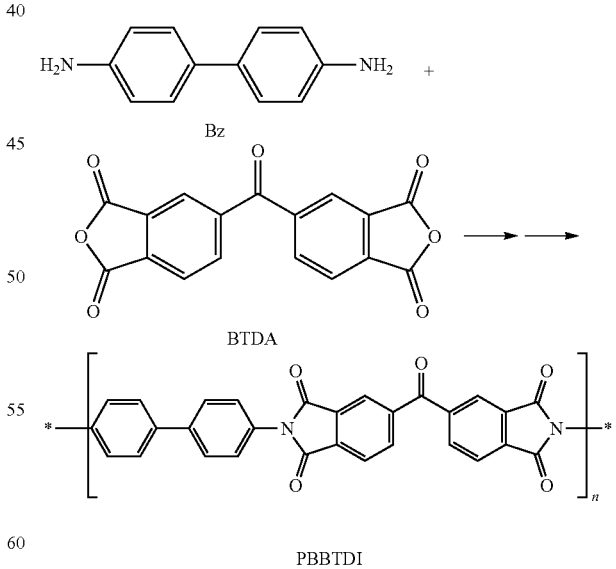

In a manner analogous to the method described in Example 3, 0.48 g (1.5 mmol) BTDA in 15 mL dist. Wasser and 0.22 g Bz were converted into the monomeric salt [$H_2Bz^{2+}BTA^{2-}$] while stirring. The $T_P$ of this monomeric salt was 172° C., as determined by TGA, which monomeric salt was subsequently introduced into a non-stirred autoclave together with 15 mL of water and heated up to HT conditions within 4.5 min and finally to 160° C. and then polycondensed for 12 h to obtain the polyimide PPBBTDI.

Figure 6:
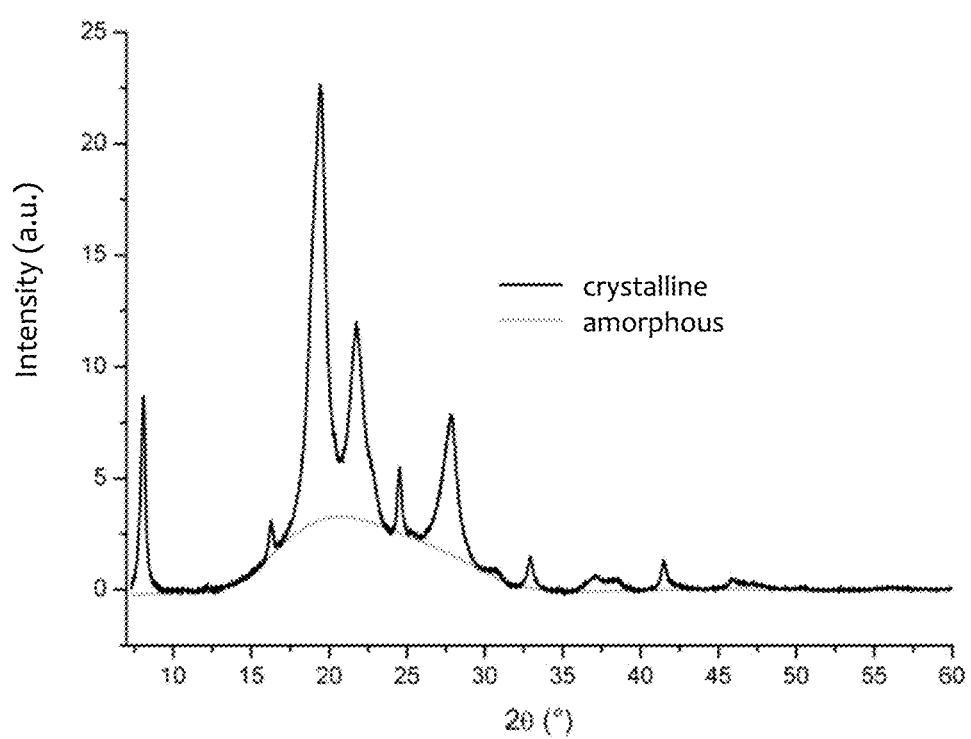
FIG. 6 shows the XRD pattern of the polyimide obtained in example 4 of the invention.

IR of the brownish crystals showed complete imidation (1786 cm$^{-1}$ (C=O imide); 1709 cm$^{-1}$ (C=O imide); 1389 cm$^{-1}$ (C—N)), as there were no discernable oscillations caused by monomers or the monomeric salt. Crystallinity was examined by powder XRD. FIG. 6 shows the XRD pattern of PBBTDI, the degree of crystallinity $X_{cr}$ of approx. 61% being again calculated from the areas below the curve of the crystalline peaks and the Gauss curve laid under it to approximately account for amorphous portions.

Without wishing to be bound by theory, it is assumed that the significantly lower crystallinity of the PPBTDI from Example 3 and the PBBTDI from Example 4 as compared to the PPPDI from the Examples 1 and 2 is due to the higher water solubility of benzophenone tetracarboxylic acid, BTA.

Example 5—Preparation of PPBTDI using Microwave Radiation

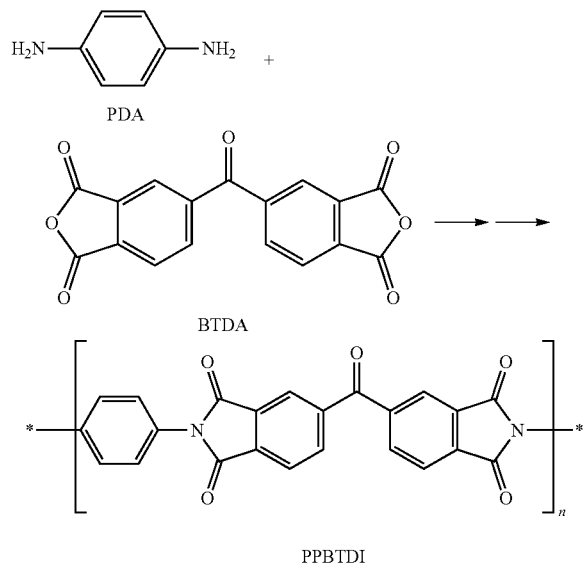

Example 3 was essentially repeated, with the exception that the heating was done by microwave irradiation, so that the hydrothermal conditions were already obtained after less than 2 min and the polymerization reaction was essentially completed after only 1 h.

Figure 7:
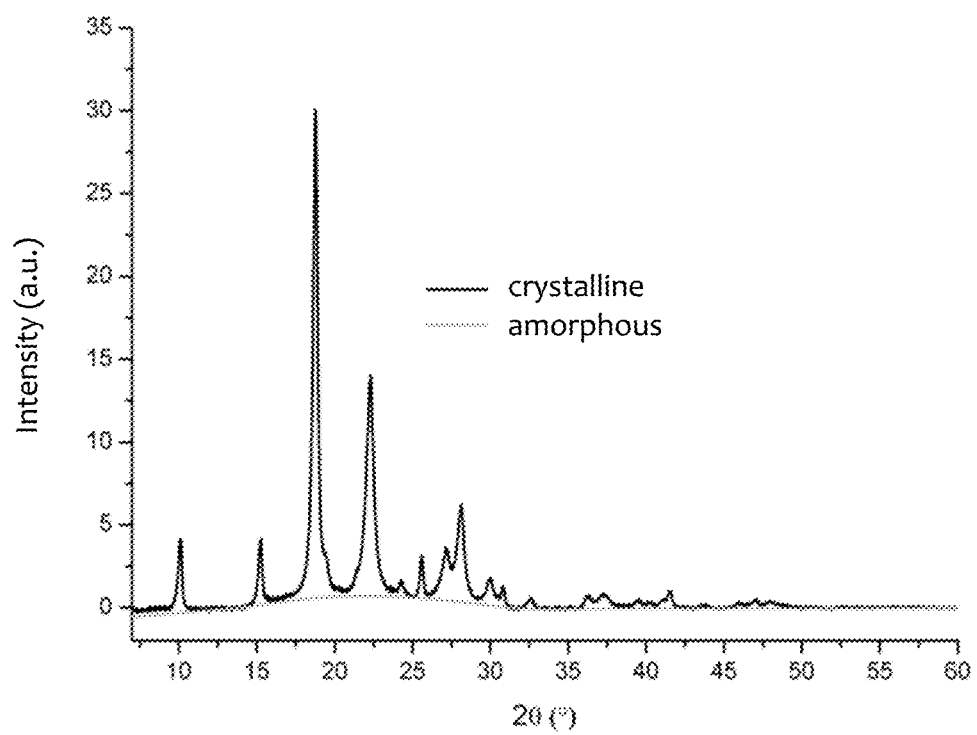
FIG. 7 shows the XRD pattern of the polyimide obtained in example 5 of the invention.

IR also showed complete imidation in this case, and FIG. 7 shows the powder XRD pattern of the obtained dried PPBTDI. From the areas under the curve of the crystalline peaks and the Gauss curve laid under it, the degree of crystallinity $X_{cr}$ was calculated to be approx. 93%, which is 31 percentage points higher than the 62% of the product obtained in Example 3. The significantly faster heating process using microwaves (2 min in Example 5 instead of 4 min in Example 3) thus resulted in a considerable increase in crystallinity by 50%, as apparently an even lower proportion of the monomeric salt dissolved before HT conditions were established.

Example 6—Preparation PBBTDI using Microwave Radiation

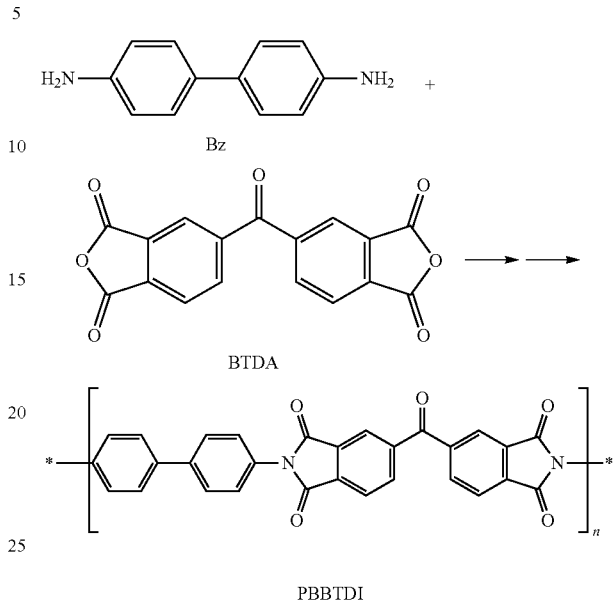

Example 4 was essentially repeated, with the exception that the heating was done by microwave irradiation, so that the hydrothermal conditions were already obtained after less than 2 min and the polymerization reaction was essentially completed after only 1 h.

Figure 8:
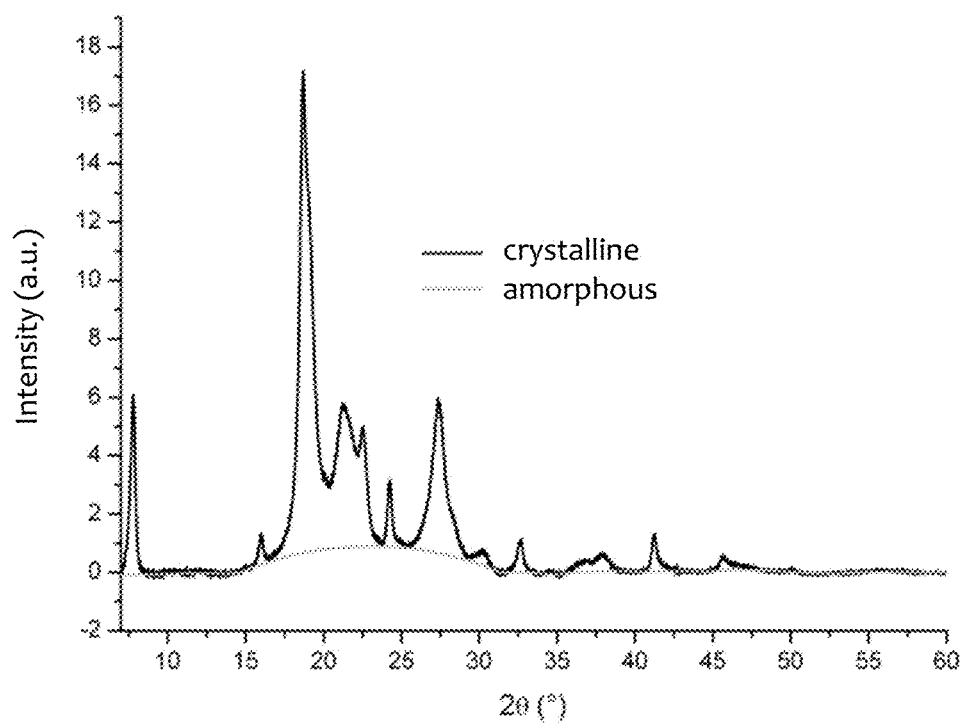
FIG. 8 shows the XRD pattern of the polyimide obtained in example 6 of the invention.

IR also showed complete imidation in this case, and FIG. 8 shows the powder XRD pattern of the obtained dried PPBTDI. From the areas under the curve of the crystalline peaks and the Gauss curve laid under it, the degree of crystallinity $X_{cr}$ was calculated to be approx. 80%, which is 19 percentage points higher than the 62% of the product obtained in Example 4. The significantly faster heating process using microwaves (2 min in Example 6 instead of 4.5 min in Example 4) thus resulted in a considerable increase in crystallinity by approx. 30%, as apparently an even lower proportion of the monomeric salt dissolved before HT conditions were established.

Example 7—Preparation of PPPDI in Ethanol

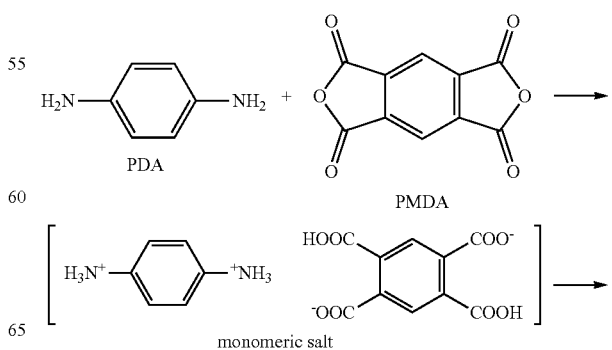

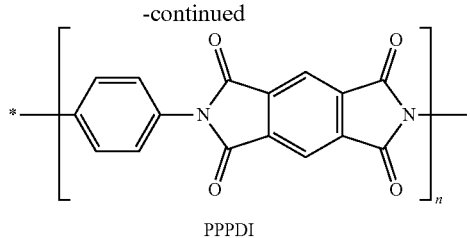

PPPDI

Example 2 was essentially repeated, with the exception that the monomeric salt was suspended in 400 mL of ethanol instead of using water for polymerization. The reaction (after heating up to HT conditions within 4.5 min and finally to 200° C.) and the subsequent work-up were also carried out in a manner analogous to Example 2.

IR was also applied in this case to verify complete imidation, the powder XRD pattern corresponding almost exactly to that from Example 1 (see FIG. 2).

It was thus possible to prove that the polycondensation of PDA and PMDA into a highly crystalline polyimide is also possible in another protic solvent than water, yielding the same excellent successful results.

Example 8—Preparation of Crosslinked Polyimide poly(benzenetri(p-phenylene)pyromellitic diimide), PBTPPDI, Using Microwave Radiation

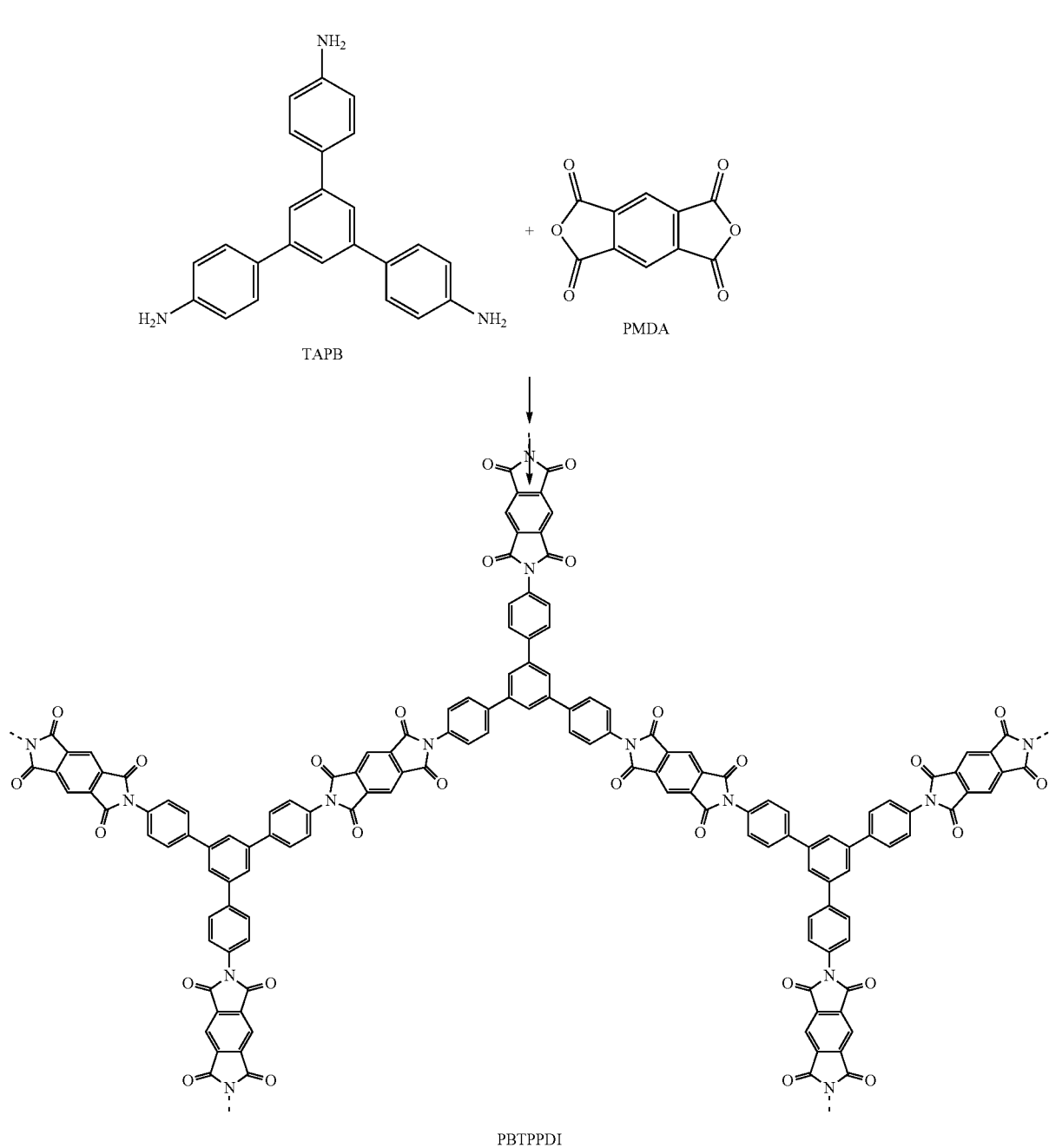

PBTPPDI

The procedure described in Example 3 was essentially repeated, with the exception that 0.06 g (0.3 mmol) PMDA and 0.07 g (0.2 mmol) TAPB were converted into the monomeric salt [(H$_3$TAPB$^{3+}$)$_2$(PMA$^{2-}$)$_3$], the T$_P$ of which was determined to be 152° C. using TGA, the salt being subsequently heated using microwaves in a non-stirred autoclav and in 15 mL of water to reach HT conditions within 2 min and finally heated at 140° C. and thereafter polycondensed for 12 h to obtain the polyimide PBTPPDI.

Figure 9:
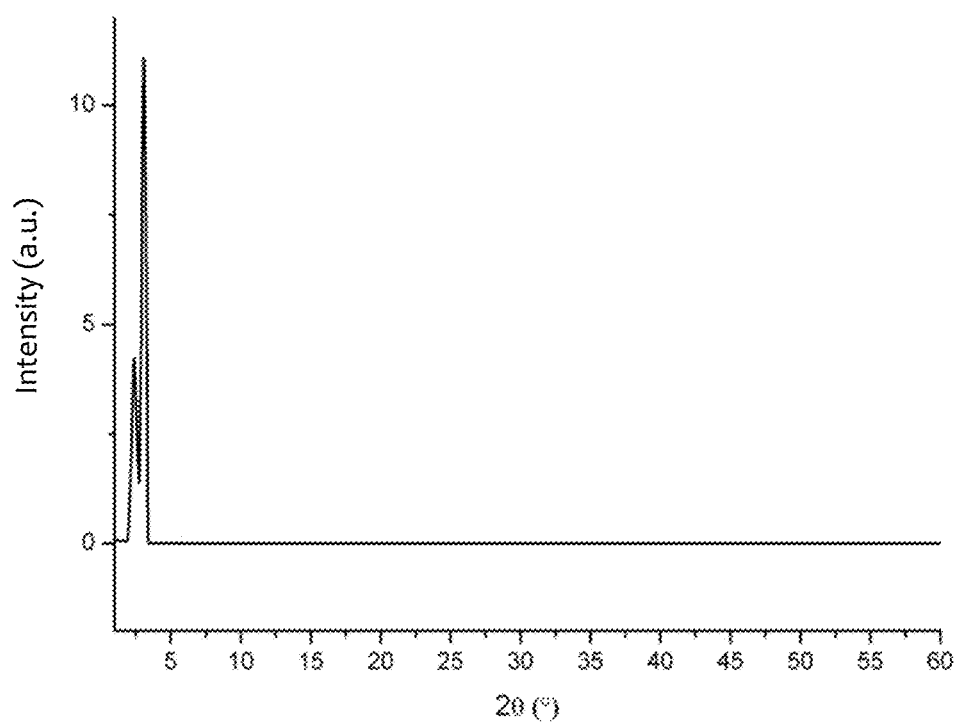
FIG. 9 shows the XRD pattern of the polyimide obtained in example 8 of the invention.

IR of the dried brown crystals again showed complete imidation (1785 cm$^{-1}$ (C=O imide); 1723 cm$^{-1}$ (C=O imide); 1390 cm$^{-1}$ (C—N)), as there were no discernable oscillations caused by the monomers or the monomer salt. Crystallinity was examined by means of powder XRD. FIG. 9 shows the XRD pattern of PBTPPDI, in which no amorphous portions can be found, indicating a degree of crystallinity X$_{cr}$ of >99%.

Example 9—Preparation of PPPDI by Injecting the Monomers into a Separately Heated Solvent

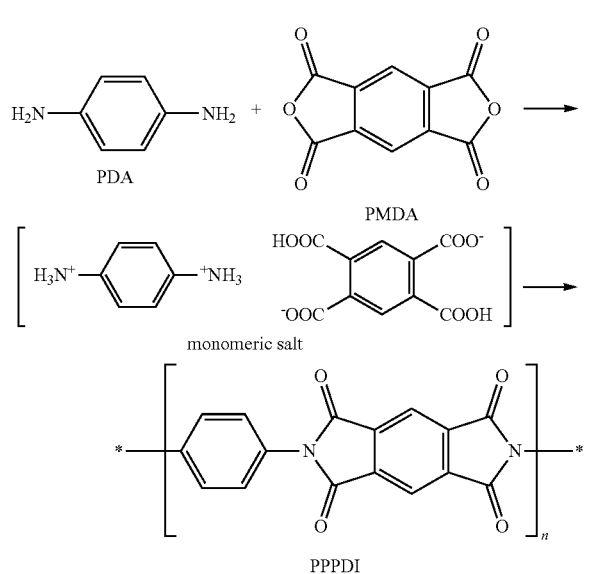

The monomeric salt was produced as described in Example 1 a), the charge being 10 times higher, however. The thus obtained salt was dispersed in 100 mL of dist. water, the dispersion was introduced into a high-pressure steel pipette which was connected to a 1 L steel reactor, separated from the reaction chamber which contained 400 mL of dist. water by a valve. The device was placed in an autoclave, and the water in the reaction chamber was heated at 200° C. under the respective autogenous pressure. When the reaction temperature was reached, the valve was opened and the monomeric dispersion was injected into the preheated solvent by means of inert gas pressure in less than 30 s. The reaction mixture was then stirred for 1 h at 200° C., whereafter the conversion was found to have been completed, and the product was isolated and dried as described in Example 1.

Figure 10:
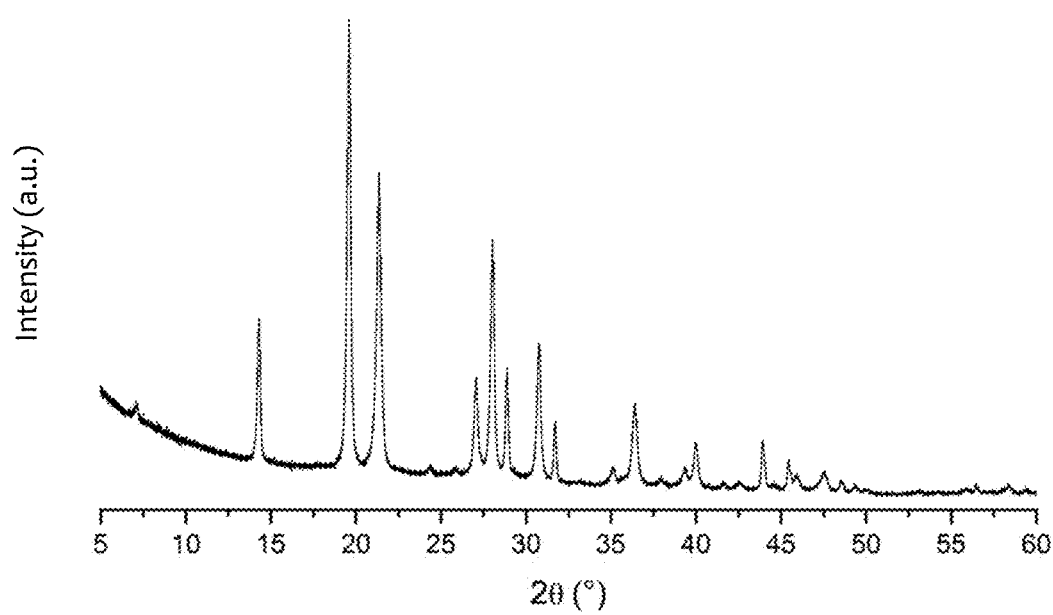
FIG. 10 shows the XRD pattern of the polyimide obtained in example 9 of the invention.

Purity and crystallinity of this PPPDI were determined by means of IR and XRD and corresponded to that of the product from Example 1 (FIG. 10 showing the respective XRD pattern). There were no discernable oscillations caused by the monomer or the monomeric salt and no amorphous portions, indicating a degree of crystallinity X$_{cr}$ of 100%.

Example 10—Preparation of PPBTDI by Injecting the Monomers into a Separately Heated Solvent In a manner analogous to the procedure described in Example 9, the reaction of PDA with BTDA was carried out using a charge 10 times higher than in Examples 3 and 5, with the exception that the reaction mixture was stirred for 4 h at 200° C. after injecting the monomeric dispersion to guarantee complete conversion.

Figure 11:
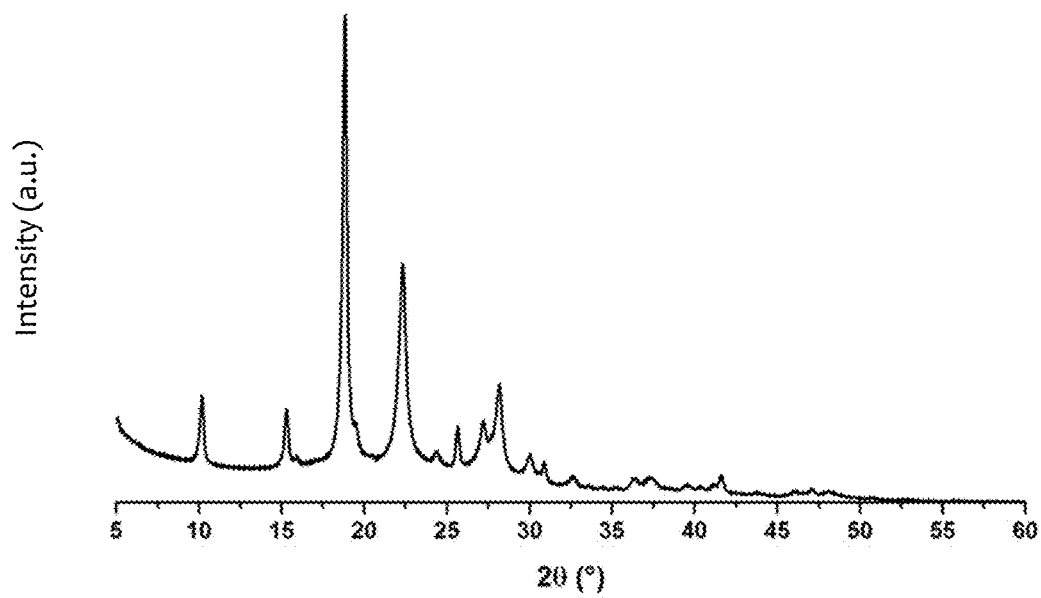
FIG. 11 shows the XRD pattern of the polyimide obtained in example 10 of the invention.

The IR and XRD peaks of the thus obtained PPBTDI corresponded to those from Examples 3 and 5; in the present case, however, there were practically no amorphous portions, which indicates a X$_{cr}$>99%. The corresponding XRD pattern is shown in FIG. 11. The product obtained after separately heating the solvent was thus significantly purer than that obtained in Example 5, as practically none of the monomers had dissolved.

Example 11—Preparation of PBBTDI by Injecting the Monomers into a Separately Heated Solvent

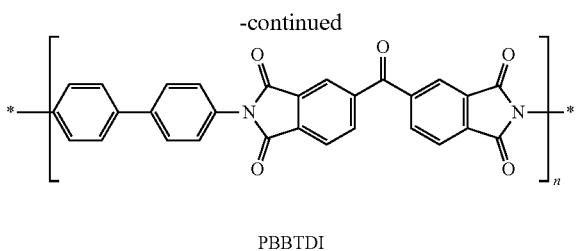

PBBTDI

In a manner analogous to the procedure described in Example 9, the reaction of Bz with BTDA was carried out using using a charge 10 times higher than in Examples 4 and 6. However, the reaction mixture, was stirred for 4 h at 200° C. after injecting the monomeric dispersion to guarantee complete conversion.

Figure 12:
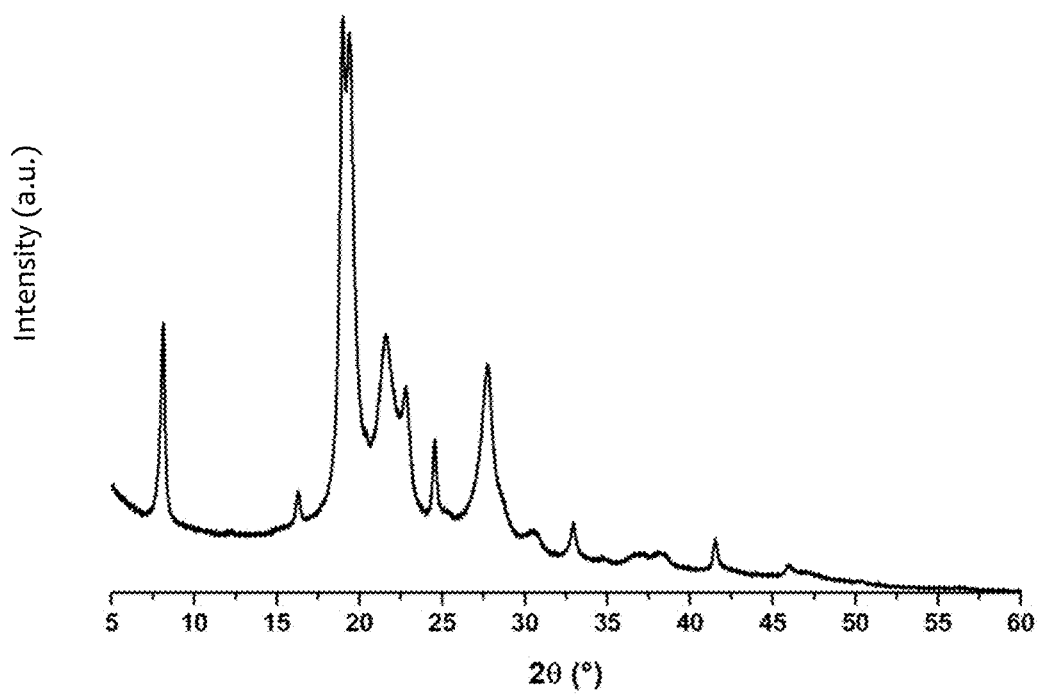
FIG. 12 shows the XRD pattern of the polyimide obtained in example 11 of the invention.

The IR and XRD peaks of the thus obtained PPBTDI correspond to those from Examples 4 and 6; in the present case, however, even fewer amorphous portions were discernible, which indicated a $X_{cr}$>90%. The corresponding XRD pattern is shown in FIG. 12. The product obtained after separately heating the solvent was thus significantly purer than that obtained in Example 6, as practically none of the monomers had dissolved, resulting in an increase of the product's crystallinity by 10 percentage points as compared to the product form Example 6.

In summary, the results of the Examples above, which are listed in Table 1 below, are proof of the excellent crystallinity of polyimides prepared according to the present invention, which may even be further increased by a higher heating rate using microwave radiation and by separately pre-heating the solvent. For structures having a very low water solubility, it may be sufficient to heat them using a heating bath or circulating air in order to obtain excellent degrees of crystallinity.

TABLE 1

| Ex. | Polyimide | $T_P$ monomeric salt (° C.) | $T_R$ (° C.) | MW | HS | Time until HT (min) | Solvent | $X_{cr}$ (%) |
|---|---|---|---|---|---|---|---|---|
| 1 | PPPDI | 205 | 200 | no | no | <4.5 | H$_2$O | >99 |
| 2 | PPPDI | 205 | 200 | no | no | <4 | H$_2$O | >99 |
| 3 | PPBTDI | 149 | 140 | no | no | <5 | H$_2$O | 62 |
| 4 | PBBTDI | 172 | 160 | no | no | <4.5 | H$_2$O | 61 |
| 5 | PPBTDI | 149 | 140 | yes | no | <2 | H$_2$O | 93 |
| 6 | PBBTDI | 172 | 160 | yes | no | <2 | H$_2$O | 80 |
| 7 | PPPDI | 205 | 200 | no | no | <4.5 | EtOH | >99 |
| 8 | PBTPPDI | 152 | 140 | yes | no | <2 | H$_2$O | >99 |
| 9 | PPPDI | 205 | 200 | no | yes | <0.5 | H$_2$O | >99 |
| 10 | PPBTDI | 149 | 200 | no | yes | <0.5 | H$_2$O | >99 |
| 11 | PBBTDI | 172 | 200 | no | yes | <0.5 | H$_2$O | >90 |

$T_P$: solid-state polymerization temperature
$T_R$: reaction temperature
MW: microwaves
HS: solvent is heated separately The advantages of preferred embodiments of the inventive method become particularly evident when comparing Examples 1, 2, and 9 for producing PPPDI, Examples 3, 5, and 10 for producing PPBTDI, and Examples 4, 6, and 11 for producing PBBTDI. A high heating rate achieved by microwaves significantly improves the crystallinity of the thus obtained products when compared to those obtained using common heating procedures. Crystallinity may even be further improved by separately heating the solvent to solvothermal conditions and only then adding the monomeric salt, as in this way practically none of the monomers will dissolve before reaching polymerization temperature.

This means that, in the latter case, the reaction temperature does not have to be kept below the solid-state polymerization temperature $T_P$ of the monomers, although this may still be preferred in certain cases.

The invention thus provides an improved method for preparing polyimides by solvothermal synthesis, which yields products showing a significantly higher crystallinity than used to be achievable according to prior art.

The invention claimed is:

1. A solvothermal synthesis process for polyimides using solution polymerization of monomers in an appropriate solvent by mixing the solvent and the monomers and heating the mixture under pressure at temperatures exceeding the respective boiling point at normal pressure, wherein crystalline polyimides are produced by:
   a) mixing and heating the solvent and the monomers by either:
      a1) heating the solvent up to solvothermal conditions and subsequently adding the monomers to initiate the reaction, or
      a2) mixing the monomers with the solvent and heating the mixture up to solvothermal conditions within a period of 5 min, the reaction temperature TR being held below the solid-state polymerization temperature TP of the monomers during the polymerization; and
   b) carrying out the solution polymerization until essentially complete conversion is achieved.

2. The process according to claim 1, wherein said mixture of monomers and solvent in step a2) is heated up to solvothermal conditions within 3 min.

3. The process according to claim 2, wherein said mixture of monomers and solvent in step a2) is heated using microwave radiation.

4. The process according to claim 1, wherein, in an additional step preceding step a), stoichiometric salts are formed from the monomers, having a molar ratio between diamine and di-anhydride of 1:1.

5. The process according to claim 1, wherein the reaction temperature TR is kept at least 5° C. below the solid-state polymerization temperature TP of the monomers.

6. The process according to claim 1, wherein water, one or several alcohols, or a mixture of water and alcohol(s) is used as the solvent.

7. The process according to claim 1, wherein an aromatic diamine and/or an aromatic tetracarboxylic di-anhydride is/are used as monomeric component(s).

8. The process according to claim 7, wherein a stoichiometric salt of an aromatic di- or triamine and an aromatic tetracarboxylic di-anhydride is used as the monomer.

9. The process according to claim 1, wherein essentially completely crystalline polyimides are prepared.

10. The process according to claim 2, wherein said mixture of monomers and solvent in step a2) is heated up to solvothermal conditions within 2 min.

11. The process according to claim 10, wherein said mixture of monomers and solvent in step a2) is heated up to solvothermal conditions within 1 min.

12. The process according to claim 5, wherein the reaction temperature TR is kept at least 10° C. below the solid-state polymerization temperature TP of the monomers.

* * * * *